July 4, 1939.  A. FERRARI  2,164,704
METHOD OF MANUFACTURE OF A PARACHUTE SURFACE
Filed Oct. 13, 1937  3 Sheets-Sheet 1
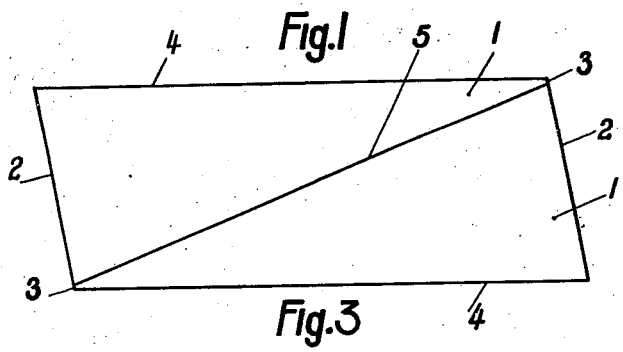
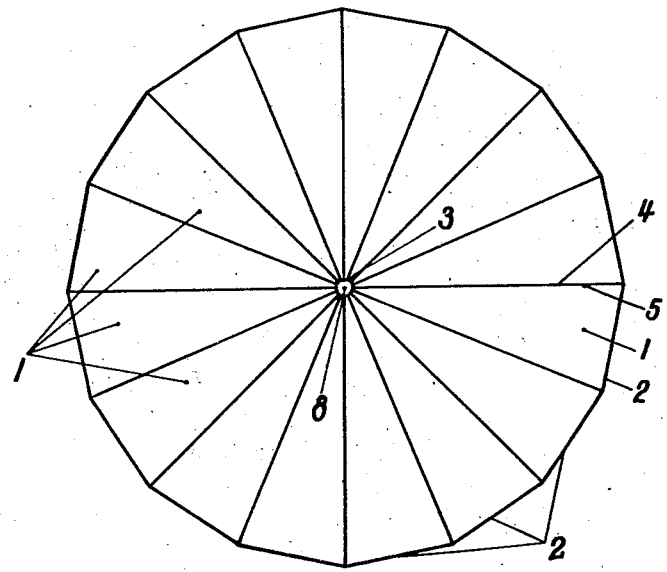
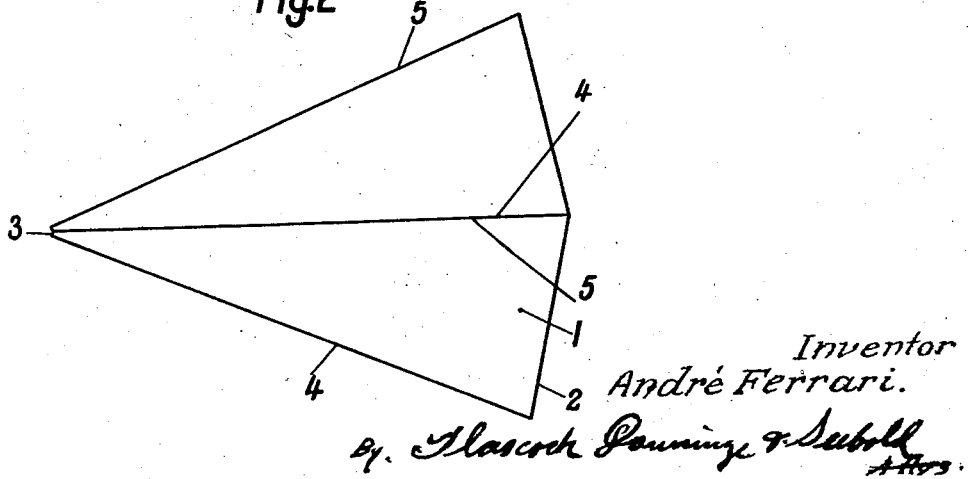
Inventor
André Ferrari.

July 4, 1939.  A. FERRARI  2,164,704
METHOD OF MANUFACTURE OF A PARACHUTE SURFACE
Filed Oct. 13, 1937   3 Sheets-Sheet 2
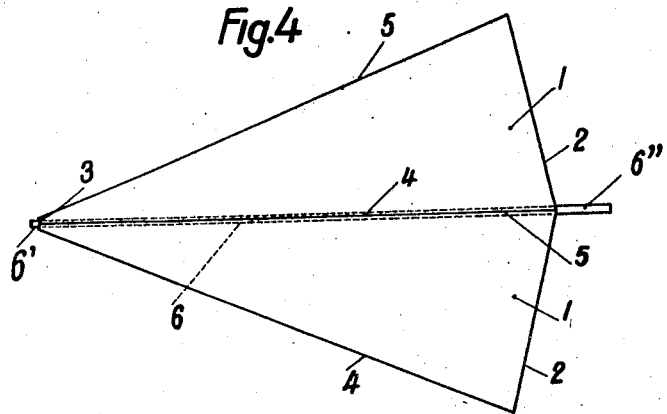
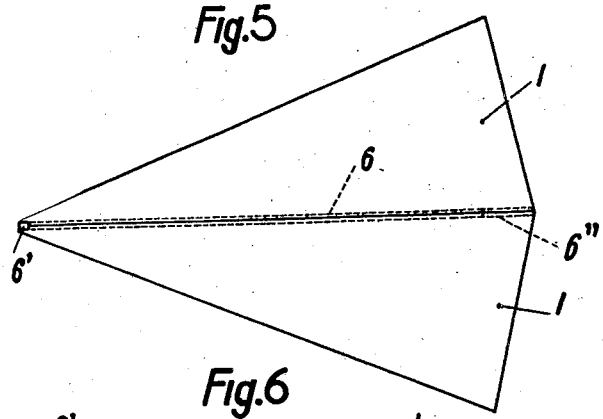
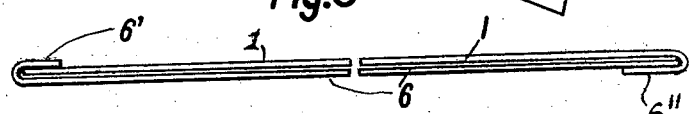
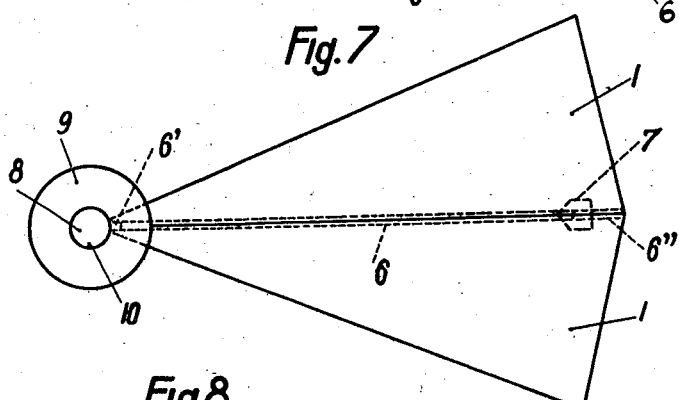
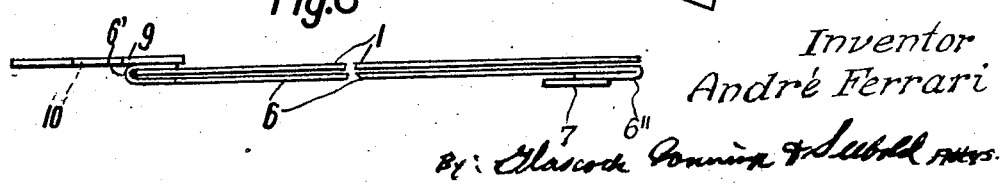
Inventor
André Ferrari July 4, 1939. A. FERRARI 2,164,704
METHOD OF MANUFACTURE OF A PARACHUTE SURFACE
Filed Oct. 13, 1937 3 Sheets-Sheet 3
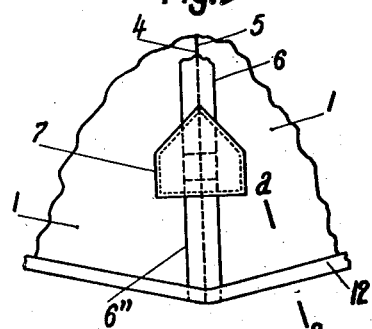
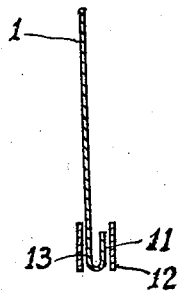
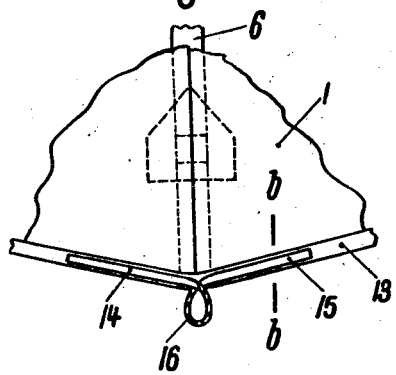
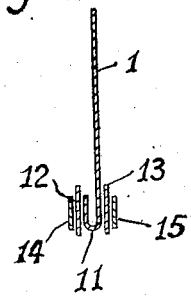
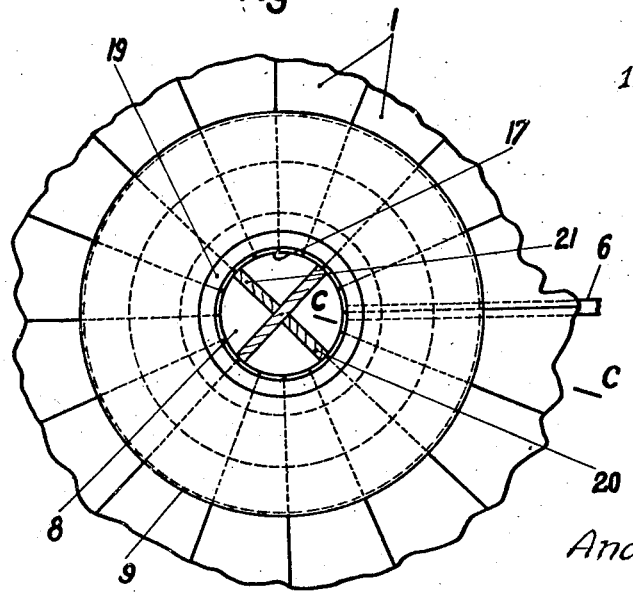
Inventor
André Ferrari Patented July 4, 1939

2,164,704

UNITED STATES PATENT OFFICE 2,164,704

METHOD OF MANUFACTURE OF A PARACHUTE SURFACE

André Ferrari, Saint-Victor-sur-Rhins, France

Application October 13, 1937, Serial No. 168,839
In France October 19, 1936

8 Claims. (Cl. 244—145)

The parachutes at present used on board aircraft cannot generally be employed for a speed above 250 km. per hour because the shock upon opening above this speed is considerable and in most cases fatal for the parachutist, and also because at these very high speeds the present fabrics are not sufficiently strong to resist jerking and become torn.

The object of the present invention is to overcome these disadvantages while permitting the manufacture of parachute surfaces capable of being used at speeds of 400 km. per hour with a shock at opening which is not greater than that to which are subjected the present types of parachutes at 250 km. the said surfaces being further sufficiently strong in order to resist any damage.

For this purpose the object of the invention is an improved method of manufacture of such surfaces as well as the new industrial product resulting in this case in a new surface for parachutes.

This method is described hereinunder and its different steps are represented diagrammatically in the attached drawings in which:

Figure 1 is a plan view showing the method for obtaining the panels constituting the surface;

Figure 2 is a plan view showing the method of assembling two consecutive panels as well as the formation of the central aperture for the air vent;

Figure 3 is a plan view above the completed assembly of all the panels;

Figure 4 is a plan view above two assembled panels showing the method of strengthening their seam;

Figure 5 is a similar view showing the finished reinforcement;

Figure 6 is a side elevation;

Figure 7 is a plan view above two reinforced panels showing the method of extra-reinforcement of the lining at the bottom of the panels as well as the method of reinforcing the top of the panels;

Figure 8 is a side elevation of same;

Figure 9 is a detailed plan view below the bottom of two assembled panels, reinforced and extra-reinforced showing the method of reinforcing the leading edge;

Figure 10 is a view of same in sectional elevation along the line a—a of Figure 9;

Figure 11 is a plan detailed view of same above the bottom of two assembled panels with reinforced leading edge showing the manner of securing the suspending ropes;

Figure 12 is a view of same in sectional elevation along the line b—b of Figure 11;

Figure 13 is a plan view above showing the method of manufacture of the air vent;

Figure 14 is a view of same in sectional elevation along the line c—c of Figure 13.

The said method of manufacture of an improved surface according to the invention comprises the following principal steps:

1. Cutting the panels.

A fabric of cotton or natural silk is taken, preferably an elastic knitted warp fabric which is cut into pieces of equal dimensions each having the form of a parallelogram of about 3.4 m. long and 1.3 m. wide for example (Figure 1).

Each parallelogram is cut nearly along a diagonal giving two trapeziums 1 of triangular shape of the same dimensions (Figure 1) of which the large base 2 has about the same length as the width of the original parallelogram, while the smaller base 3 has a length of only a few centimetres, each trapezium thus obtained constituting a panel or gore 1 of which the large sides 4 are of straight threads and the other 5 of biassed threads.

2. Assembling the panels.

A certain number of panels 1 obtained as in step 1 are taken, sixteen for example, which are arranged in such a way as to form a disc (Figure 3) the large bases 2 of each panel contributing to form the leading edge of the surface thus constituted and the smaller bases 3 the edge of the central aperture intended to form the air vent 8, the biassed side 5 of a panel 1 being always opposite the side of the straight thread 4 of the adjacent panel (Figure 2).

The said straight thread and biassed thread 4 and 5 are subsequently assembled by means of simple or multiple seams with textile thread effected either by hand or by machine.

3. Reinforcement of the assembled seams of the panels.

The shock upon opening to which the fabric is subjected being supported for the most part by the seams, the latter are strengthened as follows:

On the reverse side of the surface along each seam and across on the two assembled edges 4 and 5 of two consecutive panels is arranged a band of fabric 6 of a few centimetres in width, 3 to 4 cms. for example, and having a single, double or treble plies, this band being positioned on the seams and secured by other seams made with textile thread either by hand or by machine. The length of these reinforcing strips 6 thus formed is further such that they project beyond the upper part of the panels by a small length 6', of two to three centimetres for example, while they project beyond the lower part of the panels by a greater length 6'', for example fifteen centimetres (Figure 4).

The smaller projecting part 6' of these strengthening strips is subsequently turned over on the upper side of the surface seamed and fastened off while the greater projecting part 6'' is turned over on itself (Figures 5 and 6), seamed with textile thread and fastened off.

4. Extra-reinforcement for preventing tearing.

In order to prevent possible accidents due to tearing, on the fastening of each turned back part 6'' of the strengthening strip is arranged on the reverse side and at the bottom of the surface an extra reinforcement 7 constituted by a piece of fabric of single, double or treble thickness or plies secured at its periphery by means of seams effected by textile thread either by hand or by machine.

5. Air vent reinforcement.

Similarly in order to prevent possible tearing of the air vent 8 formed by the assembly of the small sides 3 of each of the panels 1 a reinforcement 9 of single, double or treble thickness or plies is provided having the form of a disc and provided with a circular central aperture 10 of dimensions approximately corresponding to the one 8 of the surface. This reinforcement is assembled on the upper side of the surface 1 by several circular seams with textile thread effected either by hand or by machine.

6. Reinforcement of the leading edge.

The edge of the bases of the panels is turned back on itself so as to form a tuck 11 and the said edge thus tucked is covered on each side with an interior braid 12 and an outer braid 13 (Figures 9 and 10) while being held by seams of textile thread made either by hand or by machine.

7. Formation of the suspending ropes.

Contrary to known parachutes the suspending ropes are no longer fixed to the seam lines of the surface but are only sewn to the reinforcing braids of the leading edge so as to permit the full elasticity of the surface.

Two braids 14 and 15 of about fifteen centimetres are taken and are assembled together at their centre part so as to form a ring 16 intended to receive the rope work.

The ring 16 thus made, there remain four ends of braids. Said ring is placed on the side of the seam and secured to the leading edge as follows: one end of the braid 14 is positioned on the outer braid 13 of the reinforced edge of the panel 1, and the other end on the inner braid 12 of the edge of another panel, one of the ends of the other braid 15 being positioned on the outer braid 13 of the edge of the first panel, the other end being on the inner braid 12 of the edge of the other panel, the superposed ends being held by seams connecting them together on the reinforced edge.

8. Formation of the air vent.

The small sides 3 of the panels 1 delimiting the central opening 8 of the surface with their reinforcing strips 6 turned back at 6', as well as the circular edge 10 of the reinforcement of the air vent 9 are turned back inside so as to form a tuck 17 of about one centimetre. At this edge on the inner and outer side is arranged a braid 18 and 19, the assembly being held by seams of textile thread made by hand or by machine.

9. Finally in order to connect the surface to the pilot parachute there is positioned in star formation in the air vent (Figure 13) two straps 20—21 which are secured by seams to the braids 18 or 19 of the air vent 8.

It will be understood that without departing beyond the scope of the invention, modifications, improvements and additions may be introduced and the use of equivalent means may be envisaged.

I claim:

1. A parachute of the character described comprising a plurality of gores, each gore being formed of a fabric cut out in the shape of a trapezium of triangular shape, one large side of each gore having straight threads while the opposite sides have biased threads, said gores seamed together with the large side of each gore having straight threads being united with the large side of an adjacent gore having biased threads.

2. A parachute of the character described comprising a plurality of gores, each gore being formed of a fabric cut out in the shape of a trapezium of triangular shape, one large side of each gore having straight threads while the opposite sides have biased threads, said gores seamed together with the large side of each gore having straight threads being united with the large side of an adjacent gore having biased threads, the large base of said gores constituting the periphery of the parachute while the apex of said gores form the edge of a central air vent in said parachute.

3. A parachute as claimed in claim 1 in which each gore is formed of an elastic knitted warp fabric.

4. In a parachute having a sail composed of a series of gores each in the shape of a trapezium of triangular shape seamed together at their adjacent edges, the apex of said gores forming the edge of a central air vent in said sail, a reinforcing band of fabric sewn along each assembly seam and arranged inside the sail, one end of each band being turned up around the edge of the air vent and the other end being turned over on itself adjacent the base of each gore.

5. In a parachute having a sail composed of a series of gores each in the shape of a trapezium of triangular shape seamed together at their adjacent edges, the apex of said gores forming the edge of a central air vent in said sail, a reinforcing band of fabric sewn along each assembly seam and arranged inside the sail, one end of each band being turned up around the edge of the air vent and the other end being turned over on itself adjacent the base of each gore, and a reinforcing fabric tape sewn inside the sail and covering the turned in end of each reinforcing band.

6. In a parachute having a sail composed of a series of gores each in the shape of a trapezium of triangular shape seamed together at their adjacent edges, the apex of said gores forming the edge of a central air vent in said sail, a reinforcing band of fabric sewn along each assembly seam and arranged inside the sail, one end of each band being turned up around the edge of the air vent and the other end being turned over on itself adjacent the base of each gore, a reinforcing piece of fabric secured to the edge of the central air vent and having the form of a disc provided with a central aperture, said reinforcing disc being secured to the outer surface of the sail by a plurality of circular seams.

7. In a parachute having a sail composed of a series of gores each in the shape of a trapezium of triangular shape seamed together at their adjacent edges, the apex of said gores forming the edge of a central air vent in said sail, a reinforcing band of fabric sewn along each assembly seam and arranged inside the sail, one end of each band being turned up around the edge of the air vent and the other end being turned over on itself adjacent the base of each gore, a tuck formed by turning back the base edge of each gore, and an inner and an outer braid covering the said tuck, said braids being secured to said tuck by seams to reinforce the latter.

8. In a parachute having a sail composed of a plurality of gores each in the shape of a trapezium of triangular shape seamed together at their adjacent edges, the base of said gores defining the leading edge of the sail and the apex of said gores defining the edge of a central air vent in said sail, reinforcing bands secured along each assembly seam and arranged inside the sail, one end of each band being turned up around the edge of the air vent and the other end being turned over on itself adjacent the leading edge of the sail, a tuck formed by turning back the leading edge of the sail, inner and outer braids sewn to said tuck for reinforcing the latter, inner and outer tapes having their end portions sewn to said braids, said tapes being twisted to form loops at their medial portions, a reinforcing tuck for the edge of said central air vent formed by turning over the inner edge of the gores, and crossed straps arranged in said central air vent and having their ends secured by seams to said reinforced tucked edge of the central air vent.

ANDRÉ FERRARI.